No. 807,754. PATENTED DEC. 19, 1905.
W. LOUDEN.
HAY FORK.
APPLICATION FILED APR. 29, 1905.
2 SHEETS—SHEET 1.
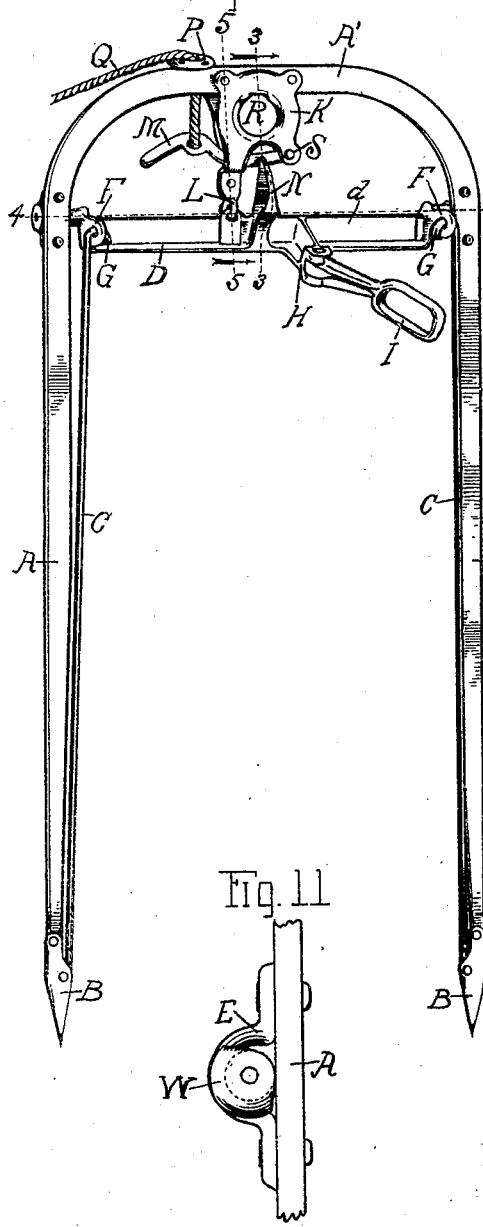
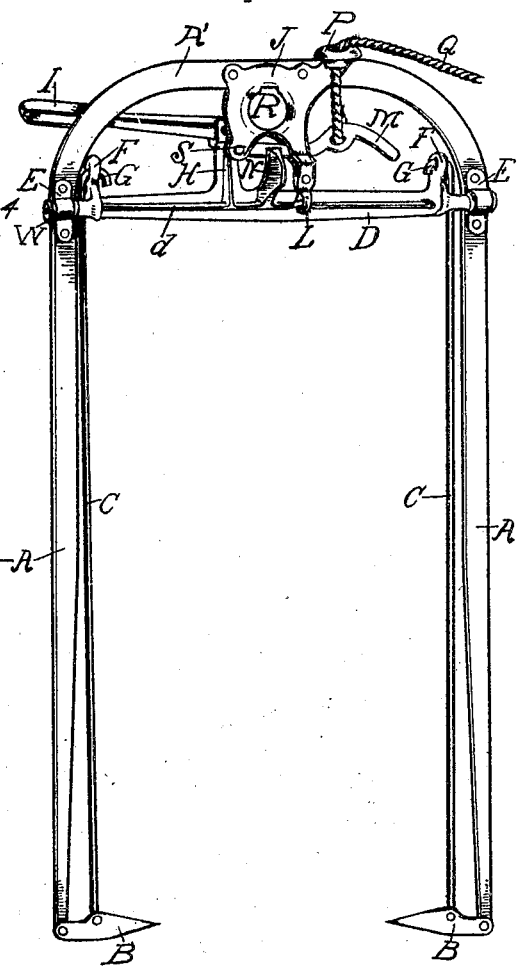
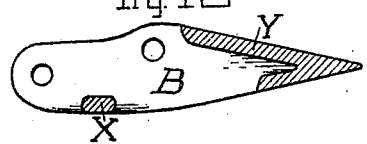
WITNESSES:
E. H. Lichtenberg
Laura J. Kampf
INVENTOR
William Louden.

No. 807,754. PATENTED DEC. 19, 1905.
W. LOUDEN.
HAY FORK.
APPLICATION FILED APR. 29, 1905.
2 SHEETS—SHEET 2.
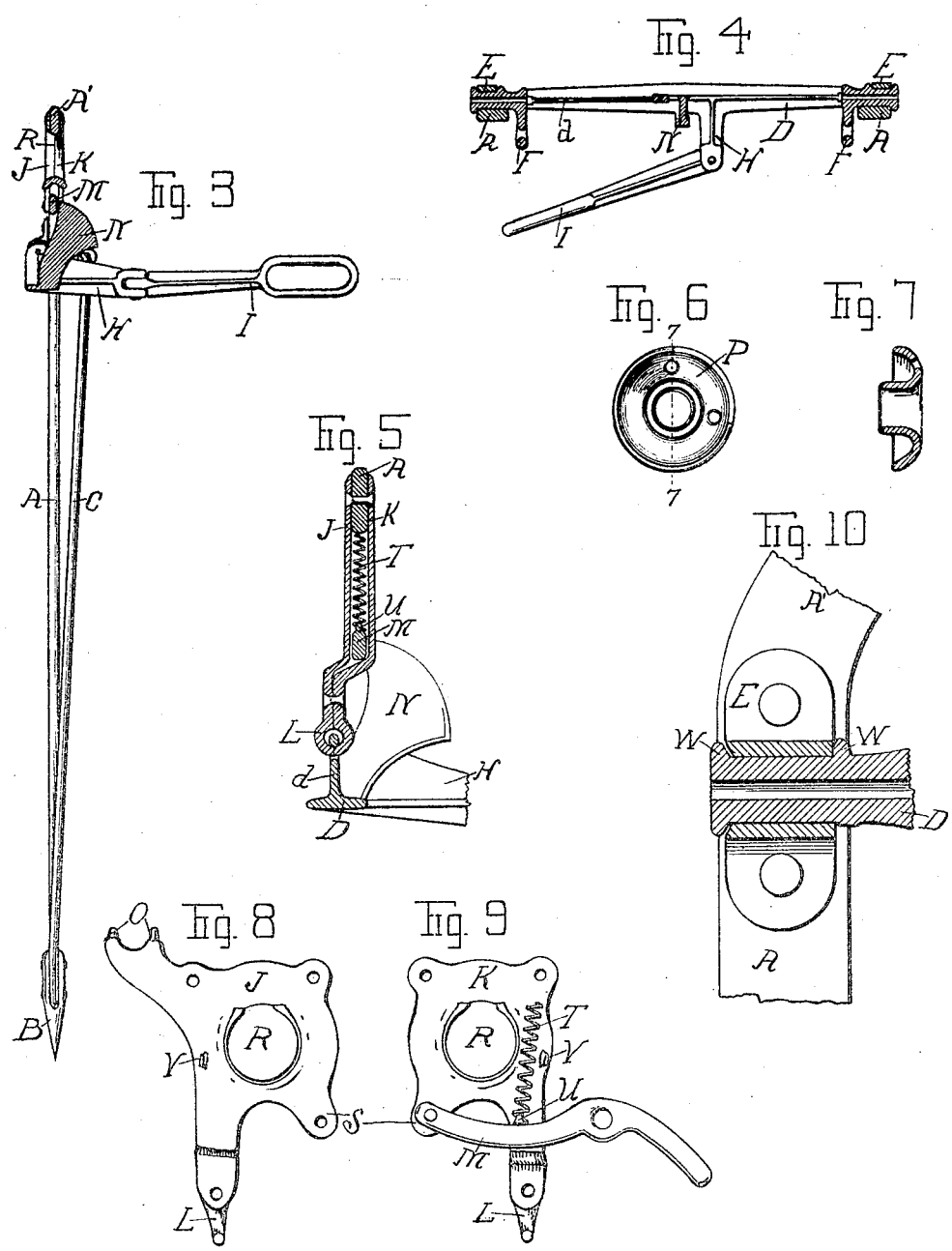
WITNESSES:
E. H. Lichtenberg
Laura J. Kampe
INVENTOR
William Louden.

UNITED STATES PATENT OFFICE.

WILLIAM LOUDEN, OF FAIRFIELD, IOWA.

HAY-FORK.

No. 807,754.     Specification of Letters Patent.     Patented Dec. 19, 1905.

Application filed April 29, 1905. Serial No. 258,090.

*To all whom it may concern:*

Be it known that I, WILLIAM LOUDEN, a citizen of the United States, residing at Fairfield, in the county of Jefferson and State of Iowa, have invented a new and useful Improvement in Hay-Forks, of which the following is a specification.

This invention relates to that class of forks commonly known as "harpoons;" and it consists of improvements in the details whereby a more substantial compact construction is secured and a more convenient easy-working fork is produced, as will be hereinafter set forth, and more specifically pointed out in the claims.

In the accompanying drawings, forming a part of this specification, Figure 1 is a side view of a fork embodying my invention in position to penetrate the hay. Fig. 2 is a view from the opposite side, showing the position of the fork when set to carry the hay. Fig. 3 is a vertical cross-section on the line 3 3 of Fig. 1. Fig. 4 is a horizontal section on line 4 4 of Fig. 1. Fig. 5 is a vertical cross-section on line 5 5 of Fig. 1 on an enlarged scale. Figs. 6, 7, 8, 9, 10, 11, and 12 are detail views.

Referring to the drawings, A represents the tines of the fork, which are preferably made of one piece of steel bent in the form of an inverted U, so as to form a bow A' at their upper ends.

B represents barbs or points which are pivoted to the lower ends of the tines. Lift-rods C are pivoted at their lower ends to the inner central parts of the barbs and at their upper ends are connected to a rocker-bar D. The rocker-bar is pivoted at each end to the upper portions of the tines A by means of boxings or caps E, secured thereto. Close to the tines arms or elbows F are formed on the rocker-bar, having eyes in their outer ends, and the upper ends of the lift-rods C are formed with hooks G to catch and rotate in these eyes. On a central portion of the rocker-bar an arm H is formed to stand substantially parallel with the arms F for the lift-rods, and on the end of this central arm a hand-lever I is pivoted, so as to fold in either direction substantially parallel with the rocker-bar. By means of this lever the rocker-bar may be rotated or oscillated, and the lift-rods C being connected to the arms F and to the barbs B, as described, the barbs will be made to assume different positions, as shown in Figs. 1 and 2. When in the position shown in Fig. 2, the folding of the lever I will prevent it from extending above the bow, where it would be more or less in the way, and being adapted to fold in either direction it will be more convenient for the operator to fold it under varying conditions.

The body of the rocker-bar is preferably made with a web $d$, having flanges on its lower edge, so as to make it substantially T-shaped in cross-section. Its ends are made round to turn in the boxings E and preferably tubular and are set on a line near the upper edge of the web $d$.

When in the position shown in Fig. 1, the body of the rocker-bar will be mostly below the line of its pivots, and when the fork is inserted in the hay the lower edge of the rocker-bar will come in contact with the hay and will act as a stop to limit its insertion. When in the position shown in Fig. 2, the body of the rocker-bar will be lifted to a level with its pivots, and this will permit the further insertion of the tines and will tend to ease the upward lift of the barbs B, therefore making the fork easier to set in the hay.

To the central portion of the bow A' two plates or head-pieces J and K are affixed by bolts or rivets, one on each side of the bow. The lower ends of these pieces are fitted with semicircular-shaped hooks or fingers L, which are adapted to close against each other and form a circular-shaped opening between them. An opening is made in the web of the rocker-bar adjacent thereto immediately below the line of its pivots and the fingers L are inserted therein, and the lower ends of the pieces are then secured together. The web of the rocker-bar is preferably enlarged at this point, so as to provide a larger bearing. The joint thus formed between the web of the rocker-bar and the lower ends of the pieces J and K will be in line with the pivots of the rocker-bar, and it will be free to turn thereon. By this means the pieces J and K and the central portion of the rocker-bar will be securely connected together and each will help to support the other.

Between the pieces J and K a latch-lever M is mounted, and on the adjoining part of the rocker-bar is a segment N, adapted to coact with the lever. The segment is set at right angles to the body of the rocker-bar, and when the fork is in the position shown in Fig. 1 the lever will drop behind one end of the segment and hold it in this position, and when in the position shown in Fig. 2 the lever will drop behind the other end of the segment and hold it in this position. The face of the segment N is formed on the line of a circle having its center approximately coincident with the line of the pivot of the rocker-bar.

The upper end of the head-piece J is provided with studs or pins O, which are adapted to project slightly above the bow A', and upon these studs a guide-loop P is mounted. A trip-rope Q is fastened to the free end of the latch-lever and is then passed up through the guide-loop. This guide-loop is of circular form and has its upper face made convex or rounding, as shown in Figs. 6 and 7, the former being a plan view of its lower side and the latter a section on the line 7 7 of Fig. 6.

The guide-loop being mounted above the bow of the fork, it will be clear that the trip-rope may be drawn in any direction and it will still be in direct line with the eye of the latch M and will come in contact only with the rounded faces of the guide-loop. By this means the fork may be unlatched by the trip-cord from any direction and will not become kinked or worn on sharp corners, no matter in what direction it may be drawn.

The pieces J and K are preferably made with coinciding eyes or openings R immediately below the bow A', into which the hook of a hoisting-pulley may be inserted to elevate the fork. Also the lower ends of the pieces are preferably made forked, the hooks L being placed on the lower ends of the longer end of the fork and the latch-lever M being pivoted between the shorter ends S, while the segment N is adapted to move between them. The longer ends of the fork are also preferably offset laterally, so that the upper ends of the pieces may be in position to embrace the upper part of the tines forming the bow A', while the lower ends L may be in position to properly connect to the rocker-shaft pivoted on one side of the tines.

The weight of the latch-lever M will generally cause it to drop behind the ends of the segment N and hold it in position either open or shut; but in order to make it act more promptly and to positively overbalance the weight of the trip-rope Q, I have inserted a coiled spring T between the sides of the pieces J and K, so its lower end will encircle and rest upon a small pin U on the upper side of the central part of the lever and its upper end will rest against the under side of the bow A', so it will bear upon the lever and press it downward. Small lugs V are are also formed on the inner faces of the pieces J and K to assist in holding the spring T in position.

Small flanges W are placed upon the pivot ends of the rocker-bar on each side of the caps E, so as to prevent endwise movement of the bar, as shown by Fig. 10, which is an enlarged section of one of the pivots. The caps E are preferably made narrower than the tines A, so the ends of the bar will not necessarily project much, if any, beyond the edges of the tines. These flanges W are made to extend only about half-way around the pivot ends of the bar, so that one side of the pivot may rest and turn directly against the tines A, as shown in Fig. 11, which is an end view of one of the pivots.

The barbs B are preferably recessed to admit the ends of the tines and lifting-rods and to lighten them, and a stay-bar X is cast integrally with the sides of the barbs between the points of the connection of the tines and lifting-rods, as shown in Fig. 12, which is a vertical section on one of the barbs. In this way the barbs may be made light and yet be strong and will not be liable in riveting to be drawn too tightly against the ends of the tines or lifting-rods. The upper face Y, upon which the hay will rest in elevating, is made solid, while the lower face is largely cut away and hollowed out, also as shown in Fig. 12.

What I claim is—

1. In hay-forks, a pair of tines connected together at the top, points pivoted to the lower ends of the tines, lift-rods connected to the central portions of the pivoted points, a rocker-bar having its body set out of line with its ends and pivoted by said ends to the upper portions of the tines, elbows on said bar near the ends thereof connected to the upper ends of the lift-rods, and a lever to operate the rocker-bar, said lever and elbows being set substantially at right angles laterally to the body of the rocker-bar, so that when its body is below its pivots, the lever and elbows will stand laterally at an angle thereto.

2. In hay-forks, a pair of tines connected together at the top, points pivoted to the lower ends of the tines, lift-rods connected to the central portions of the pivoted points, a rocker-bar pivoted on the upper portions of the tines, and connected to the upper ends of the lift-rods, the body of the rocker-bar being made T-shaped in cross-section, and set out of line with its pivots so it will drop substantially below them, as and for the purpose set forth.

3. In a fork of the character described, a rocker-bar journaled at its ends in bearings on the main parts of the fork and adapted to connect with lift-rods, a segment with a face formed on the line of a circle having its center approximately coincident with the line of the pivots of the rocker-bar and set on a central portion of the rocker-bar, a latch to engage the segment, and means to rotate the rocker-bar.

4. In a fork of the character described, a rocker-bar journaled at its ends in bearings on the main parts of the fork and adapted to connect with lift-rods, a segment on a central portion of the rocker-bar, a latch to engage the segment, at both of its ends, and means to rotate the rocker-bar.

5. In a fork of the character described, a rocker-bar having its body in cross-section, made in the shape of an inverted T, journals on its opposite ends set substantially on a line with the upper edge of its web and adapted to rotate in bearings, arms adjacent to said journals set at substantially right angles to the web of its body, and adapted to connect with lift-rods, a segment on a central portion of the body of the rocker-bar, a latch to engage the segment and means to rotate the rocker-bar.

6. In a fork of the character described, a pair of tines connected at the top by a bow, a rocker-bar pivoted below the bow, a head-piece secured to a central portion of the bow, said head-piece having a jointed connection with a central portion of the rocker-bar.

7. In a fork of the character described, a pair of tines connected at the top by a bow, a rocker-bar pivoted below the bow and having a segment affixed thereto, a head-piece secured to a central part of the bow and having at its lower end a jointed connection with a central portion of the rocker-bar, a latch mounted in said head-piece and adapted to engage the segment and means to rotate the rocker-bar.

8. In a fork of the character described, a pair of tines connected at the top by a bow, a rocker-bar pivoted below the bow, head-pieces secured to opposite sides of the bow, and at their lower ends having inwardly-curved fingers adapted to catch into an eye in a central portion of the rocker-bar and to turn therein.

9. In a fork of the character described, a pair of tines connected at the top by a bow, a rocker-bar pivoted below the bow, and having a segment affixed thereto, a head-piece secured to a central part of the bow, the lower end of said head-piece being made forked, a latch-lever pivoted in one of the forked ends and adapted to engage the segment, and the other end having a jointed connection with a central portion of the rocker-bar, and means to rotate the rocker-bar.

10. In a fork of the character described, a pair of tines connected by a bow at the top, a rocker-bar pivoted to one side of the tines below the bow, a pair of plates secured to the central part of the bow, one on each side, and their lower ends offset laterally and jointedly connected to the central portion of the rocker-bar on a line with its pivots.

11. In a fork of the character described, a pair of tines connected by a bow at the top, a pair of plates secured to the central part of the bow, one on each side and coinciding openings in the plates immediately below the bow.

12. In a fork of the character described, a pair of tines, a rocker-bar having journals on its ends, caps secured to the tines and adapted to hold said journals, said caps being narrower than the width of the tines and a flange on each side of the caps extended half-way around the journal, so that the journals will rest against the tines on one side, and the flanges will not necessarily extend beyond the edges of the tines.

13. In a fork of the character described, a circular-shaped guide-loop having convex faces on its upper side and a concave face on its lower side and a trip-rope adapted to pass up through said guide-loop and bear upon said convex faces.

14. In hay-forks, a pair of tines connected by a bow at the top, points pivoted to the lower ends of the tines, lift-rods connected to said points, a rocker-bar pivoted to the upper portion of the tines, a latch to hold and release the rocker-bar, a circular-shaped guide-loop mounted horizontally above the bow having convex faces on its upper side and concave faces on its lower side, and a trip-rope connected to the latch and passed through the guide-loop.

15. In a fork of the character described, a movable point adapted to be pivoted to the lower end of a tine and to be raised and lowered by a lift-rod, said point having its hay-supporting face made solid while its center and lower face is hollowed out and cut away, and a connecting-bar to hold its sides together between its connections to the tine and the lift-rod.

16. In a fork of the character described, a pair of tines, a rocker-bar having its body set out of line with its ends, and pivoted at its ends to the tines, and a lever projecting laterally from the body of the rocker-bar, so that when the body of the rocker-bar is below its pivots and in line with the tines, the lever will project laterally therefrom.

WILLIAM LOUDEN.

Witnesses:
FRANK SULLIVAN,
W. A. WHITE.